United States Patent

[11] 3,617,322

[72] Inventor Finn Clement, deceased
late of Cincinnati, Ohio by Gordon E. Iliff, administrator
[21] Appl. No. 13,778
[22] Filed Feb. 24, 1970
[45] Patented Nov. 2, 1971
[73] Assignee The Procter & Gamble Company
Cincinnati, Ohio

[54] DEXTRIN ADHESIVE INCORPORATING PICRIC ACID FOR DECREASING VISCOSITY AND IMPROVING SEALABILITY
6 Claims, No Drawings

[52] U.S. Cl. .................................................. 106/213,
106/208, 117/156, 127/33
[51] Int. Cl. .................................................. C08b 25/02
[50] Field of Search .................................... 106/204,
205, 208, 210, 213; 127/32, 33; 260/622 P

[56] References Cited
UNITED STATES PATENTS
3,314,764  4/1967  Sloneker ..................... 252/408 X Primary Examiner—Morris Liebman
Assistant Examiner—T. Morris
Attorneys—John V. Gorman and Richard C. Witte ABSTRACT: Improved dextrin adhesive composition for carton sealing adhesives incorporating picric acid in small amounts, the advantages of which are, inter alia, a decrease in the viscosity for a given solids content of the adhesive, and an improvement in the initial tack and the sealability.

DEXTRIN ADHESIVE INCORPORATING PICRIC ACID FOR DECREASING VISCOSITY AND IMPROVING SEALABILITY

FIELD OF THE INVENTION

The present invention relates to an improved dextrin-based adhesive composition and especially an improved dextrin adhesive composition for coated paperboard cartons, and also a process for making the same.

DESCRIPTION OF THE PRIOR ART AND BACKGROUND OF THE INVENTION

Today there is emphasis on resin emulsion adhesives for packaging. However, there is continued interest in starch derivatives because of their economy and handling properties. Starch is a polymer too—a carbohydrate polymer. For certain adhesive applications it is a valuable candidate for exploration and modification.

It is well known in the adhesives art that dextrin adhesives of a high solids content, i.e., greater than 50 percent, are difficult to spread due to high viscosity. Notwithstanding this negative feature, high solids content is desirable because it provides low water load and quicker setting time. These characteristics of an adhesive composition are especially valuable for sealing cartons, where one of the surfaces to be sealed is so called clay-coated, since only the uncoated surface can absorb a substantial amount of water. The necessary drying and setting time when sealing cartons with current dextrin adhesives may be increased threefold or more if one of the surfaces is coated, because the water elimination necessary to cause setting is obstructed.

OBJECTS OF THE INVENTION

The main object of the present invention is to provide a dextrin adhesive composition with decreased viscosity for a given solids content, improved initial tack and sealability.

Another object of this invention is to provide an adhesive which provides improved sealability when utilized on difficult-to-seal cartons such as so called clay-coated cartons.

Another object is to provide an adhesive with satisfactory economy for difficult-to-seal cartons.

Another object is to provide an easily handled adhesive for high-speed sealing of coated cartons.

Another object is to provide a dextrin adhesive bond, which is more resistant to deterioration at high humidity.

Another object is to provide a dextrin adhesive composition which is more stable against retrogradation and is mold resistant.

SUMMARY OF THE INVENTION

According to the present invention an adhesive composition is provided which meets all of the above-mentioned objects to a surprisingly high degree, having decreased viscosity for a given solids content, improved initial tack and sealability. This adhesive composition is prepared by mixing dextrin and small amounts of picric acid with water and agitating and then heating the mixture.

DETAILED DESCRIPTION OF THE INVENTION

It has been found that the addition of small amounts of picric acid to dextrin adhesive compositions, especially corn, potato, and tapioca dextrin adhesive compositions generally reduces the viscosity thereof so that the adhesive can be handled at a high solids level (up to about 65 percent or higher at room temperature) by conventional high-speed sealing equipment. Also, the initial tack and the sealability of the adhesive are improved.

The decreased viscosity of these new adhesive compositions for a given solids content permits a surprisingly satisfactory spreadability for a high solids content, along with the aforementioned advantages of low water load, insignificant water softening of the carton board, improved tack and substantially faster setting. It has also been found that the sealability of a wide spectrum of difficult-to-seal cartons is improved when picric-acid-modified dextrin adhesives are used.

It is also noted that seal joints made with the subject adhesive compositions possess an improved deterioration or retrogradation resistance at storage temperatures and on aging. The picric acid, in addition, acts as a mold inhibitor, precluding the necessity of adding other materials for this purpose.

The dextrin adhesive composition of the present invention is prepared by mixing dextrin, e.g., corn, potato, or tapioca dextrin, or mixtures thereof, and small amounts of picric acid with water, and agitating and then heating the mixture. Said composition suitably comprises from about 30 percent to about 45 percent by weight water, from about 55 percent to about 70 percent by weight dextrin, and a small amount, e.g., from about 0.01 percent to about 0.9 percent by weight, picric acid. The upper limit of the range, 0.9 percent by weight picric acid, is the approximate solubility limit thereof, when the composition comprises about 45 percent water at room temperature. A more preferred amount of picric acid from the standpoint of economics is from about 0.05 percent to about 0.3 percent by weight of the composition, and the most preferred amount thereof is about 0.15 percent by weight.

The dextrin adhesive composition of the present invention can be suitably prepared by preparing an aqueous solution of picric acid before adding dextrin. The dextrin is then added to the picric acid solution and the resulting mixture is vigorously agitated and then "cooked" at elevated temperatures. The "cooking" is a well-known step in dextrin adhesive preparation which takes place at elevated temperatures, e.g., from about 185° F., and for an extended time, e.g., from about 30 minutes to about 1 hour. When picric acid is added after the cooking of the dextrin, it is very difficult to dissolve. In addition, the later addition of picric acid does not produce an adhesive composition having the above-described desired favorable qualities, viz the viscosity is not reduced and the sealability is not improved to a significant extent.

Comparatively high concentrations of picric acid, more than 0.5 percent, may result in objectionable yellow discoloration of the bond and produces marginal increases in sealability and reductions in viscosity as compared to the improvements resulting from lower concentrations. However, no detrimental results as to sealability have been observed when such higher concentrations of picric acid are used, except that picric acid precipitation can occur in the adhesive composition when the solubility limit thereof is exceeded and that the viscosity for a given dextrin solids content can become too low for use with some forms of application equipment.

In determining which dextrin to use in the improved adhesive composition of the present invention both cost and performance are considerations. Picric-acid-modified tapioca and potato dextrin adhesives have somewhat better viscosity and sealability properties than picric-acid-modified corn dextrin adhesives, but tapioca dextrins are about twice as expensive as corn dextrins and potato dextrins come to a price about half way between the prices of tapioca and corn dextrins. Wheat, rice, waxy maize and sweet potato dextrins can also be used for the preparation of adhesive compositions according to the present invention.

As a rule, commercial borated dextrin adhesive products are not suitable for the adhesive compositions of this invention. Picric acid addition to such products often yields a thick paste, contrary to the valuable viscosity properties obtainable with nonborated essentially pure dextrin products.

Commercial dextrins suitable for the preparation of dextrin adhesive compositions according to the present invention are not necessarily virgin or unadulterated dextrin products, but generally, it is necessary that the dextrin products be free of wetting agents, borax products, and extenders.

Dextrin has a basic capability of being modified to meet many of the requirements of present-day and future packaging technology. The starch molecule can be hydrolyzed, split and/or oxidized to form a myriad of different dextrins with variable degrees of solubility, viscosity, and moisture sensitivity. It can be converted to starch esters and ethers with resin-like properties including solubility in organic solvents and thermoplastic features. It can be reacted with aldehydes to form cross-linked compounds with a high degree of water resistance and gel characteristics. Introducing polar groups into the starch molecule can improve its adhesive qualities on metallic surfaces and change its flow and wetting properties.

Still it was surprising to find that very small amounts of picric acid incorporated in dextrin adhesives modify the dextrin molecule to the extent that the viscosity of the adhesive is decidedly decreased and the sealability is improved for a given solids content.

The effect of other nitrophenols on dextrins and dextrin compositions has been studied, but the very valuable features which picric acid contributes to dextrin adhesives, i.e., the combined effect of reduced viscosity along with very satisfactory sealability on difficult-to-seal cartons, was not found. While it is possible to effect a reduction in viscosity with liquefying or wetting agents, e.g., acetic acid, urea and surfactants, these do not also improve the sealing characteristics and initial tack.

While not bound by any explanation of the chemical and physical effect of picric acid on the dextrin molecule, it is possible that a chemical reaction occurs between the dextrin molecule and the acid, resulting in favorable bonding sites on the dextrin molecule. There may also be an inclusion of the acid in the dextrin gel changing the flowing properties and thus the viscosity of the dextrin composition. A combination of these two effects is also possible since considerably reduced viscosity, as well as improved tack and bonding properties, are observed for picric-acid-modified dextrin solutions.

In dextrin adhesives, a certain amount of the dextrin is truly dissolved in water, but 40–70 percent is in gel state with much water included in the gel structure. It is possible that picric-acid-modified dextrin gel is less hydrophilic and binds smaller amounts of water. A dextrin adhesive with small amounts of water in the dextrin gel is desirable, provided such essential characteristics of the adhesive composition as viscosity, spreadability, cohesive strength, tack and storage properties, are not considerably impaired thereby.

It seems difficult to explain how improved adhesion is obtained with the new picric-acid-modified adhesives. It may be that the picric acid molecule, if chemically integrated into the dextrin gel structure, somehow enhances the bonding strength of the bonding sites on the dextrin molecule chain in relation to e.g., the susceptible oxidized areas of a flame-treated paperboard coating. The picric acid radical may be a part of a bonding site or only influencing the electron density of the bonding site.

Since the viscosity is lowered for the same solids content, the water load on the surfaces to be sealed van be reduced while maintaining satisfactory spreadability. This is especially favorable for paperboard because less water is absorbed by the substrate, obviating the problem of paperboard softening due to absorption of water. The reduced water load also presents an advantage from the standpoint of line speed since the bond will be attained considerably sooner. In addition, experience in the bonding of coated paperboard has shown that generally bond strength increases with the solids content of the dextrin adhesive. Alternatively, of course, the solids content could be maintained constant and the viscosity reduced for improved spreadability, if this is a problem.

The subject invention is not limited to use with adhesives for "high speed" packing of cartons. It is usually desirable to work with an adhesive with which a very quick and satisfactory bond is obtained. However, it is true that industry has serious problems finding inexpensive adhesive compositions meeting certain minimum requirements, such as "open time" (time elapsed after the adhesive is applied and to the moment the carton flaps are joined, generally about 10–20 seconds); "compression time" (time the cartons are in the compression belt before being packed into shipping containers, generally about 30–40 seconds); and "fiber pull" (the amount or area percentage of fibers pulled from one flap, the substrate, and adhered to the mating flap). With picric-acid-modified dextrin adhesives it now seems possible to meet these requirements in a surprisingly satisfactory way.

The picric-acid-modified dextrin adhesives of subject invention should desirably be applied in thin layers, in the range of from about 1.0 to 1.5 mils, preferably 1.2 mils. Ordinary commercially available dextrin adhesives, however, generally are applied in 2–3 mil layers. If the packager does not have application rods or rolls whereby said very thin layers can be applied, the picric-acid-modified dextrin adhesive can be applied in a layer thicker than 1.5 mils, but if this is done then it is desirable to add to the adhesive borax, $Na_2B_4O_7 \cdot 10H_2O$, in amounts up to about 15 percent by weight of the dry dextrin to improve the cohesive strength of the wet adhesive. The advantageous features of the picric acid addition such as decreased viscosity, higher solids content and improved tack and adhesion are preserved to a satisfactory extent even when such a borax compound is added.

The picric-acid-modified dextrin adhesive compositions of the present invention perform best if they are slightly heated, for example by maintaining a temperature of from about 90° to 110° F. in the adhesive tank. Generally speaking, however, less expensive application equipment can be used than in connection with standard dextrin adhesives because less critical application and drying conditions are possible. For instance, the viscosity of the adhesive composition is less influenced by changes in temperature and the drying time is convenient. If desired, instead of heating the new adhesive composition, the materials to be bonded can be preheated to serve the same purpose.

The following examples illustrate the manner in which the present invention can be practiced. However, the invention is not to be confined to the specific limitations set forth in the individual examples but rather to the scope of the appended claims.

EXAMPLE I

A dextrin-based adhesive composition was prepared as follows:

150 g. of water was heated to 120° F. in a covered vessel. 1 g. of reagent grade picric acid was dissolved in the water under agitation. 200 g. of Canary S (the code designation of a corn dextrin free of wetting agents, borax or extenders, commercially available from Stein Hall Co., of New York, N.Y.), was gradually added to the aqueous solution of picric acid and agitation continued until all lumps disappeared. The picric acid content of the mixture was about 0.28 by weight. After substantial agitation the composition was heated to 195°±5° and "cooked" for 45 min. at this temperature. Upon cooling to 90°–110° F. the solids content was 60–61 percent with satisfactory viscosity and spreadability. Coated cartons that are troublesome or impossible to seal with conventional dextrin adhesive compositions were adequately sealed by the adhesive composition obtained according to the description above. "Open time" and "compression time" could be reduced substantially and "fiber pull" developed surprisingly fast, as compared to the same adhesive compositions omitting the picric acid.

White tapioca dextrin was substituted for the corn dextrin used in the above example and cooked with picric acid according to the designated procedure. The resulting adhesive showed even lower viscosity and quicker tack at a given solids level than did the corn dextrin picric-acid-modified adhesive of the foregoing example.

Potato, wheat, rice, waxy maize, and sweet potato dextrins and mixtures of corn and potato dextrins; corn and tapioca dextrins; corn, potato and tapioca dextrins; and potato and tapioca dextrins are substituted for the corn dextrin adhesive of the above example and each yields an adhesive composition with substantially improved viscosity and sealability characteristics, as compared to that made of such dextrin or mixture but without picric acid addition.

The above picric-acid-modified dextrin adhesive compositions do not retrograde when stored at room temperature for periods up to six months.

EXAMPLE II

To illustrate the effect of the amount of picric acid in the adhesive compositions of the present invention on the viscosity of said compositions and on the sealability attained with said compositions, the following tests are used:

To measure the viscosity of an adhesive composition a so called "falling ball" test is used. A stainless steel ball with a diameter of one-fourth inch is dropped in a vertically extending rigid Pyrex tubing (½-inch diameter), filled with the adhesive composition to be tested. The time for the ball to drop 5½ inch is recorded and is a satisfactory measure of the viscosity of the adhesive composition.

To measure the sealability of an adhesive composition, the "fiber pull" (the area percentage of fibers pulled from a cartonboard strip, the substrate, and adhered to a mating strip), is determined with the following test:

3-inch×4-inch sample strips are cut from a certain carton material. They are conditioned for 24 hours at 73° F., 50 percent R.H. before testing. The adhesive to be applied is heated in a receptacle at 110° F. ±2° F. A sugar refractometer is used to check the dextrin solids content. A sample strip is taped down on a level, flat, hard work surface, preferably a sheet of slate, marble or equivalent material, with the back liner side of the sample exposed. A glue applicator bar is aligned with the test strip. The bar has an opening, 2 inches ×0.0012 inch, the width and thickness of the glue film, which will be applied on the test strip by the glue applicator. Sufficient adhesive is placed on the test strip ahead of the bar, and in line with said opening. The bar is immediately pulled across the sample, in 1 second, no downward pressure being exerted on it. At this point, a stop watch is started. An open time of 5 seconds is allowed. Then a matched sample is placed on top of the first, with the front liner contacting the adhesive surface. The samples are rolled once with a 20-pound roller. The purpose of this is to iron out any irregularities between the surfaces of the two test strips that might have resulted when cutting or handling the samples. After the test strips are rolled, a 5-pound weight plate is placed on top of them. The bottom of the plate is covered with rubber pad to obtain uniform pressure over the samples. The time lapse from the finish of the adhesive drawdown until the placing of the weight plate on the samples is 10±2 seconds. The purpose of the weight plate is to simulate the pressure exerted on a carton in the compression belts of a certain packing line. After 45±2 seconds, the weight is removed and the samples are pulled apart. The top strip is pulled away from the bottom strip with a slow, steady, even pull at an angle of 45°. The percentage of fiber pull is determined by estimate.

A sample test series for determining the influence of addition of picric acid on the fiber pull capacity of a dextrine adhesive composition is repeated 10-20 times to obtain convincing average fiber pull values as a function of the picric acid content.

Corn adhesive compositions are prepared in the manner of example I except that the amount of picric acid is varied, from 0 to about 0.9 percent by weight of the mixture of water, dextrin and picric acid.

The falling ball test (with the adhesive heated to about 110° F.) and the fiber pull test give the following viscosity and sealability values:

From the foregoing results it will be seen that the viscosity and sealability characteristics of the dextrin adhesive are improved substantially by the use of picric acid in accordance with the present invention. It will also be realized that the bulk of such improvements are realized in the 0.05 percent to 0.3 percent range of picric acid addition.

The above compositions do not retrograde when stored at room temperature for periods up to six months.

EXAMPLE III

An adhesive was prepared according to example I, except that 100 g. of water, 0.5 g. of reagent grade picric acid and 200 g. of 10596 Potato (the code designation of a potato dextrin free of wetting agents, borax or extenders, commercially available from Stein Hall Co.), were used. The picric acid content of the mixture was about 0.17 percent. The obtained solids content of the adhesive was 62-63 percent. The viscosity of the adhesive was substantially decreased as compared to a dextrin adhesive made from identical materials without the picric acid. The adhesive was very satisfactory for high-speed sealing of difficult-to-seal coated cartonboard surfaces.

The above composition does not retrograde when stored at room temperature for periods up to six months.

EXAMPLE IV

An adhesive was prepared according to example I, except that 0.2 g. of reagent grade picric acid and 14R Tapioca (the code designation for a tapioca dextrin free of wetting agents, borax or extenders, commercially available from Stein Hall Co., New York, N.Y.) were used. The obtained solids content was 60-61 percent. The viscosity was decreased as compared to a similar adhesive prepared without picric acid. The overall sealing performance of the dextrin adhesive of this example is substantially better in connection with difficult-to-seal coated cartonboard surfaces than the same adhesive without picric acid as an ingredient.

When 0.035 g. (about 0.01 percent of the adhesive composition) was used instead of the 0.2 g. of the above example, as compared to the same adhesive without the picric acid, a viscosity decrease was noticeable and the sealing performance on coated cartonboard was improved. When 3.1 g. (about 0.9 percent of the composition) was similarly substituted, the viscosity decrease was considerable and the sealing performance very satisfactory, although it was found that the set adhesive had a conspicuously yellowish hue.

The above compositions do not retrograde when stored at room temperature for periods up to six months.

COMPARATIVE DATA

Dextrin adhesive compositions are produced according to example I, III, and IV, except that other phenols, i.e., 2,5-dinitrophenol, o-nitrophenol, m-nitrophenol, and p-nitrophenol, are substituted for picric acid. The resulting adhesive compositions do exhibit slightly reduced viscosity but no improved sealing characteristics.

EXAMPLE V

The flaps of 20 flame-treated clay-coated cartons were sealed with the picric-acid-modified corn dextrin adhesive prepared according to example I. Four cartons each were stored at 120° F./10% R.H., 80° F./15% R.H., 80° F./85% R.H., and 0° F./10% R.H. and four were cycled between 0° F. and 120° F./10% R.H. After three months the carton seals were examined and no deterioration was found.

| Picric acid, percent | 0 | 0.05 | 0.1 | 0.2 | 0.3 | 0.4 | 0.5 | 0.6 | 0.7 | 0.8 | 0.9 |
|---|---|---|---|---|---|---|---|---|---|---|---|
| Viscosity, seconds | 80 | 50 | 38 | 25 | 20 | 18 | 16 | 14 | 13 | 13 | 12 |
| Sealability, percent | 40 | 66 | 75 | 84 | 88 | 89 | 90 | 90 | 90 | 90 | 90 |

EXAMPLE VI

Sealing tests were made on a difficult-to-seal coated carton board with the picric-acid-modified corn dextrin adhesive of example I which had been stored for 5 months at room temperature. The adhesive showed no indications of deterioration and performed very well in sealing such carton board.

EXAMPLE VII

A corn dextrin adhesive composition was produced in accordance with the process of example I, adjusting the proportions of the ingredients so that the solids content of the "cooked" adhesive composition was 53–54%. This was achieved by mixing 175 g. of water, 200 g. of Canary S and 0.95 g. reagent grade picric acid. The picric acid content was about 0.25% by weight of the composition. Upon application of the adhesive to flame-treated coated board, a deterioration-resistant seal giving about 80 percent "fiber pull" was developed in 20 seconds. When the picric acid was omitted from an otherwise identical adhesive, the resulting adhesive was more viscous and upon application to similar cartons the "fiber pull" percentage was about the same in 20 seconds, but the bond deteriorated rapidly at 80 percent humidity.

In addition to the embodiments described herein, other arrangements and variations within the spirit and scope of the subject invention and the appended claims will occur to those skilled in the art.

What is claimed is:

1. The adhesive composition comprising dextrin, small amounts of picric acid, and water, said composition having been agitated and heated.

2. The dextrin adhesive composition of claim 1 comprising from about 30 percent to about 45 percent by weight water, from about 55 percent to about 70 percent by weight dextrin, and from about 0.01 percent to about 0.9 percent by weight picric acid.

3. The dextrin adhesive composition of claim 2, wherein the dextrin is selected from the group consisting of corn dextrin, potato dextrin, tapioca dextrin and mixtures thereof.

4. The dextrin adhesive composition of claim 2, wherein the amount of picric acid is from about 0.05 percent to about 0.3 percent by weight.

5. The dextrin adhesive composition of claim 4, wherein the amount of picric acid is about 0.15 percent by weight.

6. The process of preparing a dextrin adhesive composition comprising:

a. mixing from about one one-hundredths to about nine-tenths parts by weight of picric acid and from about 55 to about 70 parts by weight of dextrin with from about 30 to about 45 parts by weight of water and vigorously agitating the resulting mixture; and b. heating said mixture to from about 185° F. to about 205° F. for from about 30 minutes to about 1 hour.

* * * * *

PO-1050
(5/69)

UNITED STATES PATENT OFFICE
CERTIFICATE OF CORRECTION

Patent No. 3,617,322  Dated November 2, 1971

Inventor(s) Finn Clement, deceased late of Cincinnati, Ohio by Gordon E. Iliff, administrator It is certified that error appears in the above-identified patent and that said Letters Patent are hereby corrected as shown below:

Column 2, line 33 "185°F., and" should read -- 185°F. to about 205°F., and --.

Column 3, line 54, "van" should be -- can --.

Column 4, line 53 "5°." should read -- 5°F. --.

Signed and sealed this 18th day of April 1972.

(SEAL)
Attest:

EDWARD M.FLETCHER,JR.          ROBERT GOTTSCHALK
Attesting Officer              Commissioner of Patents